United States Patent
Grimm et al.

(10) Patent No.: US 6,367,871 B2
(45) Date of Patent: Apr. 9, 2002

(54) ROOF MODULE FOR MOTOR VEHICLES

(75) Inventors: Rainer Grimm; Horst Böhm, both of Frankfurt (DE)

(73) Assignee: Meritor Automotive GmbH (DE)

( * ) Notice: Subject to any disclaimer, the term of this patent is extended or adjusted under 35 U.S.C. 154(b) by 0 days.

(21) Appl. No.: 09/729,620

(22) Filed: Dec. 4, 2000

(30) Foreign Application Priority Data

Dec. 11, 1999 (DE) .......................................... 199 59 809

(51) Int. Cl.$^7$ .............................................. B62D 25/06
(52) U.S. Cl. ....................................................... 296/210
(58) Field of Search ........................................ 296/210

(56) References Cited

U.S. PATENT DOCUMENTS 4,634,196 A * 1/1987 Nestell .................. 296/97.9 X
4,981,323 A * 1/1991 Dowd et al. ................. 296/214

FOREIGN PATENT DOCUMENTS

DE 19709016 A1 10/1998

* cited by examiner

*Primary Examiner*—Dennis H. Pedder
(74) *Attorney, Agent, or Firm*—Carlson, Gaskey & Olds

(57) ABSTRACT

A roof module for a motor vehicle, with an inner shell molded out of plastic foam which, in the vicinity of its support on the body framework, is divided into an upper layer which can be supported on the body framework and a lower layer that serves to line the body framework. Sun visors and handholds are pre-assembled on the lower layer. In order to improve and simplify assembly of the roof module on the vehicle body, it is envisaged that the upper layer, and thus the roof module as a whole, can be securely fixed to the body framework using just the fixing screws for the sun visors and the handholds. Preferably, captive fixing screws on the bearing elements of the sun visors and the handholds should also be able to be pre-assembled on the lower layer of the inner shell.

12 Claims, 2 Drawing Sheets

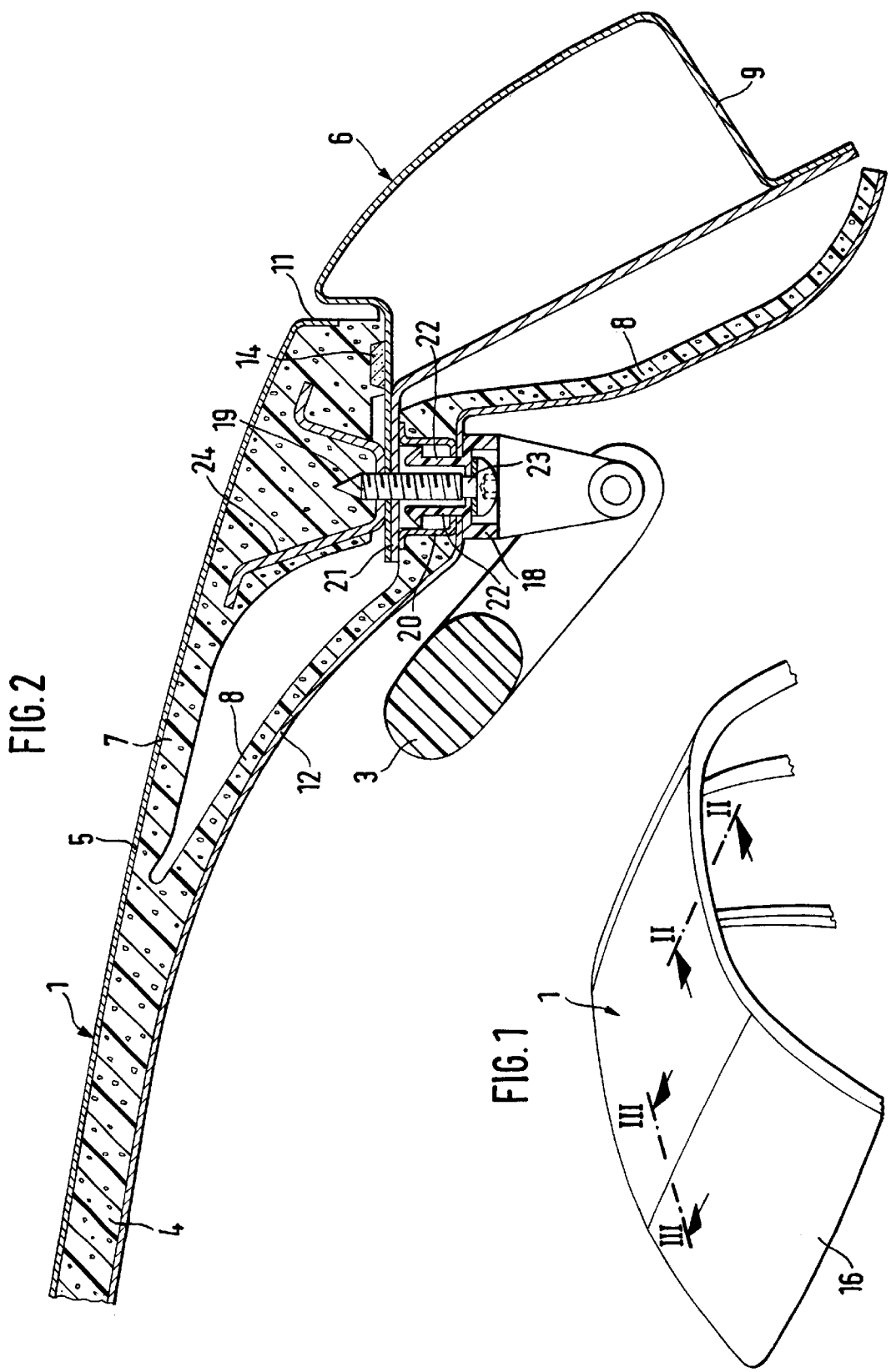

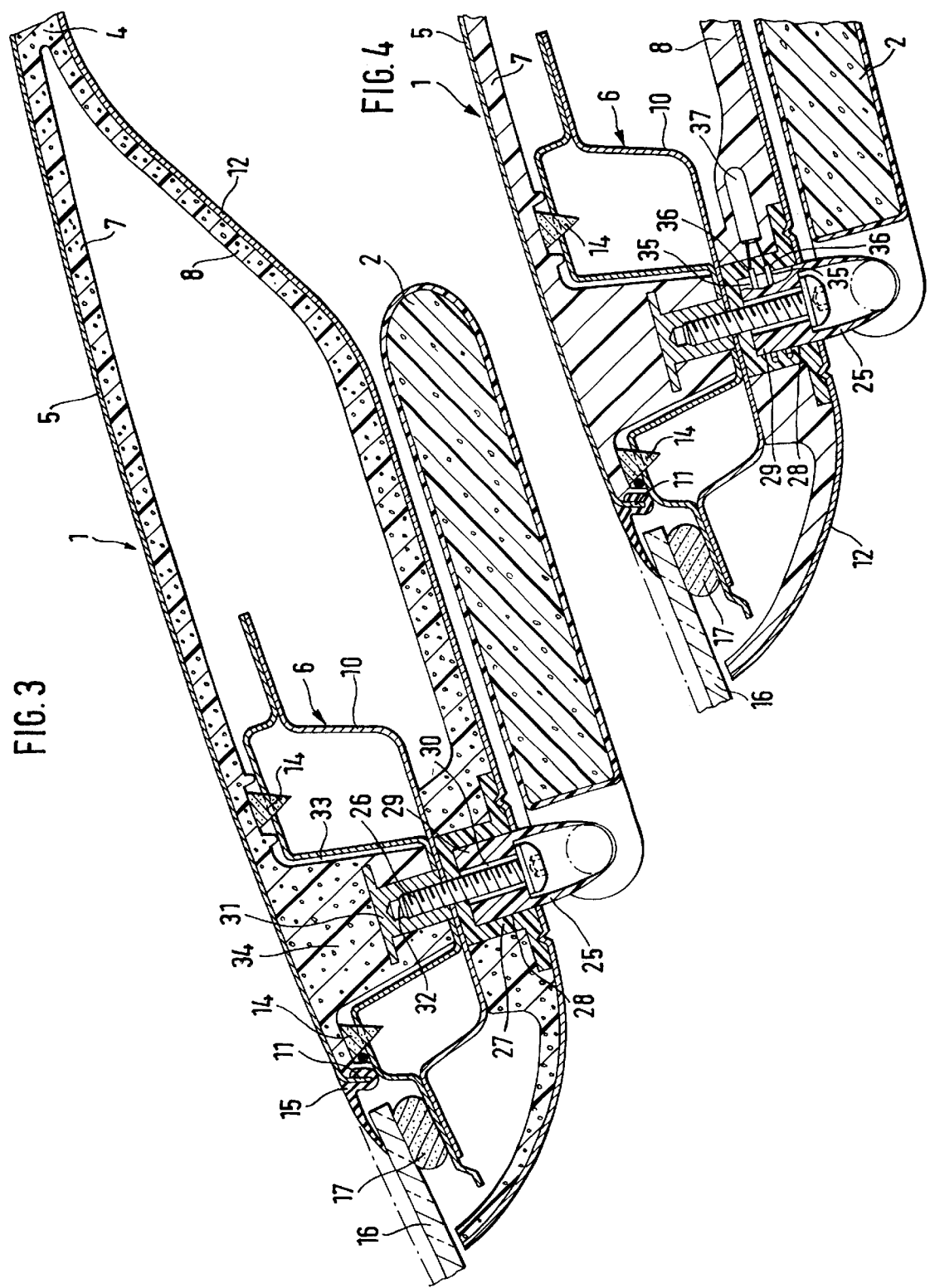

ROOF MODULE FOR MOTOR VEHICLES

BRIEF DESCRIPTION OF THE PRIOR ART

The invention concerns a roof module for motor vehicles.

Such modular, prefabricated, ready to be installed vehicle roofs are finished separately from the vehicle body and are only joined to the vehicle body on the assembly line in the factory. Particularly because they crucially reduce assembly times on the assembly line, such vehicle roof modules are enjoying increasing significance.

Particularly advantageous in this respect are those roof modules, the functional elements of which are pre-assembled on the inner shell of the roof module. In a known vehicle roof (DE 197 09 016 A1), the bendable down lower layer of the inner shell is furnished with pre-assembled functional elements, for example sun visors and handholds, at suitable positions. Here the bearing elements for the sun visors and the handholds are each designed as swivel fixed pivot brackets which are locked in place in the corresponding grooves in the lower layer and, where applicable, through the grooves in the interior roof lining material, thereby facilitating pre-assembly of the sun visors and the handholds on the inner shell of the roof module.

After supporting the roof module on the upper layer of the inner shell and securing the upper layer to the body framework using adhesive (DE 197 09 016 A1, FIG. 3) and/or fixing screws (DE 197 09 016 A1, FIG. 5), the body framework is lined with the lower layer of the inner shell, whereupon fixing screws are screwed into the front cross rail and the side rails of the body framework through the swivel fixed pivot brackets, thereby securing the sun visors and/or the handholds and the lower layer of the inner shell in the vicinity of the sun visors and the handholds.

SUMMARY OF THE INVENTION

An object of the invention is to further improve and simplify both the pre-assembly options for the sun visors and the handholds on the inner shell and assembly of the roof module on the body framework.

According to the present invention, there is provided a roof module for a vehicle body of a motor vehicle, of sandwich beam construction, the roof module having an inner shell which is molded out of plastic foam to form an interior roof lining, manufactured separately from the vehicle body, and having outer edges which can be supported on the framework of the vehicle body and be securely fixed to this, the vehicle body framework having a front cross rail and side rails, where the inner shell is divided into two layers in the vicinity of the outer edges intended to be supported on the body framework, of which an upper layer can be supported on the bodywork framework, whilst a lower layer of which can be bent down and is designed to line the body framework, whereby the lower layer is further furnished with pre-assembled sun visors in the vicinity of the front cross rail of the vehicle body framework and pre-assembled handholds in the vicinity of the side rails of the vehicle body framework; where in the sun visors and the handholds are pivoted on bearing elements which are connected to the lower layer of the two layers, whereby fixing screws can be fed through the bearing elements to catch in the front cross rail and/or the side rails of the body framework and which secure the bearing elements and the lower layer on the vehicle body framework and wherein both the upper layer of the inner shell, and thus the roof module as a whole, can be securely fixed to the bodywork frame using just the fixing screws for the sun visors and the handholds.

By using the fixing screws for the sun visors and the handholds to secure not only the said functional elements and the lower layer of the inner shell to the body framework, but to secure at the same time the entire roof module to the body framework, according to the invention, assembly of the roof module on the assembly line in the factory is crucially further simplified and assembly times crucially reduced.

Pre-assembly of the roof module can be even more far-reaching if captive fixing screws too are pre-assembled on the pre-assembled bearing elements. This opens up the possibility of pre-mounting as many different screws as are used on each of the bearing elements during manufacture of the roof module so that they can in fact simply be twisted and/or screwed in during later assembly of the roof module on the vehicle body, yet ensuring that they cannot fall out of the bearing elements in an axial direction.

By expanding sleeve bushes into the lower layer of the inner shell at the points where the fixing screws are fed through during the foam process for producing the inner shell of the roof module, the mounting positions for the sun visors and the handholds and, following assembly of the roof module on the body framework, the distance between the bearing elements and the rails of the body framework are set. When tightening the fixing screws, by taking up the power of reaction produced by the tensile force of the screws, the sleeve bushes ensure that the lower layer of the inner shell does not become deformed at the mounting positions of the bearing elements for the sun visors and the handholds.

For pre-assembly of the handholds, bendable, elastic snap-in elements are mounted on the pivoted bearing elements supporting the handholds which can be simply and quickly locked in place in the expanded sleeve bushes, all bearing elements each havin a device to captivate the fixing screws already fed through. Pre-mounting of the fixing screws is advantageous here in that devices are immediately available on the bearing elements.

For pre-assembly of the sun visors, the expanded sleeve bushes are furnished with devices to secure the fixing screws. For their part, the fixing screws guided through the bearing elements of the sun visors hereby hold the pre-assembled bearing elements of the swivelling sun visors mounted thereon.

The devices used to captivate the pre-assembled fixing screws are suitably simple penetration holes located in the bearing elements of the handholds and/or on the sleeve bushes for the bearing elements of the sun visors. Such penetration holes have a diameter which is less than the outer diameter of the thread of each of the fixing screws, ensuring that the fixing screws pushed or screwed tight into the penetration holes cannot fall out.

Fixing elements can be expanded into the upper layer of the inner shell at the positions of the fixing screws. The fixing screws can be screwed into such fixing elements during assembly of the roof module on the body framework after being guided through the corresponding perfect-fit holes arranged in the rails of the body framework.

The sleeve bush for the sun visor expanded into the lower layer of the inner shell can be designed as a pivot bearing, whereby this bearing is favourably already formed during the foam process for producing the inner shell. Here, a bearing bore in the sleeve bush takes a pivot bearing pin to which the sun visor, hinged outside of the pivot bearing, is connected. The design of the other, detachable, drag bearing on each sun visor does not come under the scope of the present invention. In any case, the elements of this detachable drag bearing are also secured to the lower layer of the inner shell, ensuring that each sun visor can be swivelled in the direction of the adjacent side panel of the vehicle body using the pivot bearing, after first detaching it from the drag bearing.

In an advantageous, yet invisible to the naked eye, manner, electrically conductive slip rings securely fixed around the perimeter of the bearing screw are connected to electric conductors to which the lighting equipment of a vanity mirror located on the sun visor is connected whereby, after mounting the bearing screw, the slip rings in the pivot bearing remain in contact with sliding-action contact pieces which extend into the bearing bore of the pivot bearing and the electric feeds of which are expanded into the inner shell. The pivot bearing and the bearing pin thus allow the illuminated vanity mirrors mounted on the sun visors to be connected to an electricity supply.

BRIEF DESCRIPTION OF THE DRAWINGS

Further particulars of the invention are explained in more detail hereinafter with reference to the drawings showing the embodiments, in which:

FIG. 1 shows a diagrammatic view of the roof area of a passenger car in perspective, FIG. 2 shows a truncated section through a roof module secured to the side rail of the body framework in the vicinity of a handhold, which corresponds to the line II—II in FIG. 1, FIG. 3 shows a truncated section through a roof module secured to the front cross rail of the body framework in the vicinity of the pivot bearing of a sun visor, which corresponds to the line III—III in FIG. 1, and FIG. 4 shows a truncated section similar to FIG. 3 through another embodiment of the pivot bearing.

DESCRIPTION OF THE PREFERRED EMBODIMENT

The roof module 1 comprises two sun visors 2 arranged next to each other in the usual way and two handholds 3 arranged in tandem on each of its two sides as normal which are located in mounting positions which can be easily reached by passengers seated in the front and by those seated on the rear bench or similar.

In the embodiment shown, the inner shell 4 of the roof module 1 is molded out of plastic foam which is expanded onto a rigid roof skin 5. The rigid roof skin 5 is made up of deep-drawn sheet metal, for example sheet aluminium, or can be fabricated out of vacuum-molded plastic sheeting. However, the invention may also be applied to embodiments of the roof module which are not furnished with a fixed roof skin. Here the roof module is essentially made up of hard, shell-like, and inherently rigid, molded plastic foam with a smooth, coatable outer surface.

In the vicinity of the outer edges intended to be supported on the body framework 6, the inner shell 4 is divided into two layers, of which the upper layer 7 is supported on the body framework 6, whilst the lower layer 8 projects out over the outer edges of the vehicle roof and can be bent down in order to allow for passage through the body opening bounded by the body framework 6 without any resulting permanent deformation. Only one of the two side rails 9 of the body framework 6 is shown in FIG. 2 and in FIGS. 3 and 4, only the front cross rail 10. The lower layer 8 is used to line the body framework 6 and is furnished with the pre-assembled sun visors 2 in the vicinity of the front cross rail 10 and the pre-assembled handholds 3 in the vicinity of the side rails 9.

Suitable materials for the inner shell 4 are high-resistance plastic foams with a polyurethane base which can be reinforced using fibrous material, for example fibre glass sections, assimilated into the plastic before it is expanded. Equally suitable for reinforcement are, however, weaves, knits, fibres and the like laid into the foaming mould. By expanding the reinforced inner shell 4, the upper layer 7 of which extends up to the fold 11 of the roof skin 5, a sandwich beam composite roof module showing high deformation resistance and strength is produced. All the contours of the inner shell 4, including that of the lower layer 8 and its profiling, are produced by the corresponding shape of the foaming mould (not shown).

The inner surface of the inner shell 4 can be coated with a textile or sheet-like lining material 12 to create an interior roof lining. In the vicinity of its support on the body framework 6, the upper layer 7 is furnished with circular molded location notches 13, in which cement beads 14 which seal and also partly secure the body framework 6 against the roof module 1 are received, a fact which is only hinted at diagrammatically in FIGS. 3 and 4. A sealing profile 15 is pushed and expanded onto the front fold 11 (FIGS. 3 and 4) which sits with its outward-projecting lip sealing the outer surface of the windscreen 16. Between the windscreen 16 and the outward-projecting flange of the front cross rail 10, another cement bead 17 assumes the task of securing and sealing the windscreen 16 towards and away from the vehicle body.

Each handhold 3 is pivoted around two bearing elements 18, of which only one is visible in FIG. 2. With reference to FIG. 2, the securing situation is described hereinafter with regard to just one bearing element 18. All the other bearing elements of the handholds are secured in the same way.

At the point where the fixing screw 19 is guided through, a hat-like sleeve bush 20 which is open to the top, and deep-drawn from steel sheet for example, is expanded into the lower layer 8 of the inner shell 4. The height of the sleeve bush 20, which corresponds to the thickness of the lower layer 8, sets the distance between the bearing element 18 and the lower surface of a supporting flange 21 of the side rail 9 and provides the bearing element 18 with a secure support on the supporting flange 21 when tightening the fixing screw 19.

On the bearing element 18, injection molded from a plastic of suitable strength for example, there are several preferably single-piece, elastic, bendable snap-in elements 22, which are inserted through a scuttle in the sleeve bush 20 whilst under elastic strain and, after passing their hooked ends through the scuttle, are then put back in the position shown in FIG. 2, again under elastic strain, thereby locking the bearing element 18 and the sleeve bush 20 in place. In this way, the handholds 3 connected to the bearing elements 18 are pre-assembled on the lower layer 8 of the inner shell 4.

A penetration hole for the fixing screw 19 is located in the bearing element 18, the diameter of which is less than the outer diameter of the thread of the fixing screw 19. After locking the bearing element 18 in place in the sleeve bush 20, the fixing screw 19 is inserted through the narrow penetration hole until a cylindrical shank section 23 is found in the penetration hole between the screw head and the threaded area of the fixing screw 19. Similarly, from now on the captive fixing screw 19 which can be turned easily in this position is pre-assembled on the roof module 1.

As emerges from FIG. 2, on each side of the roof module 1, a strengthening piece 24 is embedded in the upper layer 7 by expanding a fixing element for the fixing screws 19 into the foam material in the form of a continuous profile into which the fixing screws 19 can be screwed. The lower surface of the strengthening piece 24 lies flat against the supporting flange 21 of the side rail 9.

By mounting it on the vehicle body with strengthening pieces 24 on both sides, the roof module 1 is placed on the supporting flange 21 so that the fixing screws 19 can be screwed into the strengthening pieces 24 through the perfect-fit assembly holes (not shown) arranged in the supporting flanges 21. In this way, the lower layer 8 and the upper layer 7 of the inner shell 4 are securely fixed together by the tension of the supporting flange 21, at the same time securing the handholds 3 on the cross rails 9 of the body framework 6.

Reference will now be made to FIG. 3 in order to explain the mounting procedure for the sun visors 2. Illustrated and described here is the securing situation for just one bearing element 25, designed as a pivot/drag bearing in a manner yet to be described. This bearing element projects out to the side on each sun visor 2, whilst the sun visors each possess a detachable drag bearing at each turned end which can also be pre-assembled on the lower layer 8 of the inner shell 4 and can even be fabricated out of the same; however this is not illustrated or described here as this detachable drag bearing of each sun visor does not come under the scope of the present invention.

Here too, a hat-like sleeve bush 27 which, in this case, is open to the bottom is expanded into the lower layer 8 of the inner shell 4 at the point where the fixing screw 26 is guided through. The sleeve bush 27 possesses a bearing bore 28 that takes a bearing pin 29 located on the bearing element 25 in order to create a pivot bearing. The bearing pin 29, which can be pushed in and twisted inside the bearing bore 28, is furnished with an axial bore-hole 30 which is open to both sides for guiding through the associated fixing screw 26. The sun visor 2 is pivoted on the outer end of the bearing element 25 outside of the pivot bearing.

In this case too, the captive fixing screw 26 is pre-assembled, whereby the sleeve bush 27 assumes the task of captivating the fixing screw 26 already guided through. For this purpose, the sleeve bush 27, injection molded from a plastic of suitable strength for example, is furnished with a narrow penetration hole at its closed upper end for the associated fixing screw 26, the diameter of which is less than the outer diameter of the thread of the fixing screw 26. Thus if the fixing screw 26 is pushed or screwed into this narrow penetration hole, the fixing screw 26 is captivated on the sleeve bush 27 and is thus pre-assembled and, for its part, secures with its screw head the bearing element 25 and the sun visor 2 located thereon in the pre-assembled position on the lower layer 8 of the inner shell 4.

A fixing element 31 which possesses a tap hole 32 open to the bottom is expanded into the upper layer 7 of the inner shell 4 at the point of the fixing screw 26. The front cross rail 10 possesses, at least at the point of the fixing element 31, a hollow 33 which is open to the top and designed like a cup or a trough. The hollow 33 accepts a similarly shaped thickening 34 in the upper layer 7. The fixing element 31 is expanded into the thickening 34. The fixing element 31 is perfectly located at the position of the fixing screw 26 which, after placing the upper layer 7 on the front cross rail 10, can be screwed into the tap hole 32 through a penetration hole (not shown) in the sheet metal wall structure of the front cross rail 10 aligned with the tap hole 32. In this way, the upper layer 7 is securely fixed to the lower layer 8 using the fixing screw 26 using the sheet metal wall structure of the front cross rail 10 as an intermediate layer, whereby both the bearing element 25 and the sun visor 2 held by it are mounted on the body framework 6 lined by the lower layer 8 of the inner shell 4.

Essentially, the embodiment shown in FIG. 4 corresponds to that described with reference to FIG. 3. However, electrically conductive slip rings 35 are securely fixed around the perimeter of the bearing pin 29 to connect an illuminated vanity mirror (not shown) on the sun visor 2 to an electricity supply. The slip rings 35 are connected to electric conductors (not shown) to which the lighting equipment of a vanity mirror mounted on the sun visor 2 is connected. After mounting the bearing pin 29, the slip rings 35 in the bearing bore 28 remain in constant contact with the sliding-action contact pieces 36 which extend into the bearing bore 28 of the pivot bearing, the electric feeds 37 of which are expanded into the lower layer 8 of the inner shell 4.

A roof module for motor vehicles is proposed, with an inner shell molded out of plastic foam which, in the vicinity of its support on the body framework, is divided into an upper layer which can be supported on the body framework and a lower layer that serves to line the body framework. Sun visors and the handholds are pre-assembled on the lower layer. In order to improve and simplify assembly of the roof module on the vehicle body, it is envisaged that the upper layer, and thus the roof module as a whole, can be securely fixed to the body framework by simply using just the fixing screws for the sun visors and handholds. Preferably, captive fixing screws on the bearing elements of the sun visors and the handholds should also be able to be pre-assembled on the lower layer of the inner shell.

It will be understood that the invention is capable of modification and therefore is not to be limited to the precise details set forth. Rather, various modifications may be made in the details within the scope and range of equivalents of the claims without departing from the spirit of the invention.

We claim:

1. A roof module for a vehicle body of a motor vehicle, comprising:

an inner shell that is molded out of plastic foam to form an interior roof lining, manufactured separately from the vehicle body, and having outer edges adapted to be supported on a framework of the vehicle body and to be securely fixed to the vehicle body framework, the vehicle body framework including a front cross rail and side rails, the inner shell being divided into two layers in the vicinity of the outer edges, one of the layers being supportable on the vehicle body framework, the other of the two layers being adapted to be bent down to line the body framework;

pre-assembled sun visors furnished on the lower layer of the inner shell in the vicinity of the lower layer that is adapted to be received at the front cross rail of the vehicle body framework;

pre-assembled handholds on the lower layer in the vicinity of the lower layer that is adapted to be received at the side rails of the vehicle body framework;

bearing elements connected to the lower layer of the inner shell, the bearing elements pivotally supporting the sun visors and the handholds, respectively; and fixing screws adapted to be fed through the bearing elements, the fixing screws being adapted to catch in the corresponding portion of the vehicle body framework, each fixing screw operating to secure one of the bearing elements, the lower layer and the upper layer of the inner shell to the vehicle body framework.

2. The roof module of claim 1, wherein the fixing screws are captively preassembled on the bearing elements.

3. The roof module of claim 1, including sleeve bushes in the lower layer of the inner shell at the points where the fixing screws are received through the lower layer, the sleeve bushes setting a distance between the bearing elements and the corresponding portion of the vehicle body framework.

4. The roof module of claim 3, including bendable, elastic snap-in elements adapted to be locked in place with the sleeve bushes, the snap-in elements being mounted on the bearing elements for the handholds and wherein the bearing elements each include a device adapted to captivate the fixing screws.

5. The roof module of claim 4, wherein the device is a penetration hole for the associated fixing screw, the diameter of the penetration hole being less than the outer diameter of the thread of the fixing screws.

6. The roof module of claim 3, wherein the sleeve bushes each include a device adapted to captivate the fixing screws.

7. The roof module of claim 6, wherein the device is a penetration hole for one of the fixing screws, the diameter of the penetration hole being less than the outer diameter of the thread of the fixing screw.

8. The roof module of claim 3, wherein at least one sleeve bush is associated with each sun visor, the sleeve bushes including a bearing bore that receives a bearing pin mounted on the bearing element which includes an axial bore-hole open to both sides for feeding through the associated fixing screw, and wherein the sun visor is pivoted on the bearing element outside of the pivot bearing.

9. The roof module of claim 8, including electrically conductive slip rings securely fitted around the circumference of the bearing pin, the slip rings being connected to electric conductors, the slip rings in the pivot bearing remaining in contact with sliding contacts after the bearing pin has been fitted, the sliding contacts extending into the bearing bore of the pivot bearing and having electrical leads that are foamed into the inner shell.

10. The roof module of claim 1, including fixing elements expanded into the upper layer of the inner shell at locations to receive the fixing screws, the fixing elements being adapted to receive the fixing screws.

11. The roof module of claim 1, wherein each one of the fixing screws secures one of the inner shell layer outer edges to the vehicle body framework.

12. The roof module of claim 1, wherein the fixing screws secure the bearing elements to the lower layer, the lower layer to one side of the body framework and the upper layer to another side of the body framework.

* * * * *